United States Patent [19]

Hölter et al.

[11] 4,148,145
[45] Apr. 10, 1979

[54] APPARATUS FOR MEASURING GAP WIDTH OF DUAL ROLLER TRACK

[75] Inventors: Karl Hölter, Witten; Hans Schrewe, Duisburg; Gerd Diederich; Fritz P. Pleschiutschnigg, both of Düsseldorf, all of Fed. Rep. of Germany

[73] Assignees: Mannesmann Aktiengesellschaft, Düsseldorf; Gustav Wiegard Maschinenfabrik, Witten, both of Fed. Rep. of Germany

[21] Appl. No.: 827,614

[22] Filed: Aug. 25, 1977

[30] Foreign Application Priority Data

Aug. 27, 1976 [DE] Fed. Rep. of Germany ....... 2639240

[51] Int. Cl.² .......................... G01B 5/14; G01B 7/14
[52] U.S. Cl. ................................ 33/143 L; 33/174 L; 33/182
[58] Field of Search ............ 33/143 L, 147 K, 147 N, 33/174 L, 182; 164/4, 150

[56] References Cited

U.S. PATENT DOCUMENTS

| 3,937,271 | 2/1976 | Akiba et al. | 33/182 |
| 3,939,568 | 2/1976 | Gonos et al. | 33/143 L |
| 3,962,794 | 6/1976 | Kima et al. | 33/182 |
| 3,983,631 | 10/1976 | Dutzler | 33/143 L |

Primary Examiner—Richard R. Stearns
Attorney, Agent, or Firm—Smyth, Pavitt, Siegemund, Jones & Martella

[57] ABSTRACT

The apparatus includes a parallelogram-like foldable frame, opposite corners of which carry centering rollers to position the frame between two opposite track rollers; feelers measure the distance to the latter. The frame can be hung between the tracks or can be self-propelled by a belt drive. Some of the centering rollers can be used for reeling tests of the track rollers.

7 Claims, 3 Drawing Figures

APPARATUS FOR MEASURING GAP WIDTH OF DUAL ROLLER TRACK

BACKGROUND OF THE INVENTION

The present invention relates to equipment for measuring operating parameters of tracks which include two roller tracks facing each other across a transport path and engaging an object from opposite sides. More particularly, the invention relates to equipment for measuring the gap width between dual roller tracks.

Roller tracks of this type are usually employed for withdrawing and supporting an ingot emerging from a mold for continuous casting. The two roller tracks engage the ingot from opposite sides and due to curving of the tracks, the ingot is veered into the horizontal. Such dual roller tracks are used also for withdrawing plate stock from rolling mills. In all these cases, it is quite important that the path gauge meets the desired criteria, that is to say, the width of the transport path defined as the shortest distance and gap width between two rollers facing each other across that path, has to be such that the object to be moved is, in fact, engaged from opposite sides without being squeezed. In the past large gap widths have been measured by a technician using, for example, micrometer-like instrumentation. This procedure was cumbersome and not free from errors. Also, optical measurements have been made from the outside. As far as known to us, suitable automated equipment has not been suggested for this purpose, nor are we aware of equipment making obvious the measurement of the gap width between two roller tracks as contemplated by us.

DESCRIPTION OF THE INVENTION

It is an object of the present invention to provide a new and improved apparatus for measuring the distance between rollers of two tracks facing each other across a transport path and without human intervention. The apparatus should be usable also in curved tracks and paths.

In accordance with the preferred embodiment of the invention, it is suggested to provide a foldable and unfoldable frame having, for example, elevational contour of a variable parallelogram of which two extremities, such as opposing corners, are provided with centering rollers (one set per corner), respectively, to engage two track rollers which face each other across the transport path. The centering rollers position the frame as a whole and a feeler arrangement therein, which measures the gap width between the two track rollers. Command signals for positioning the feelers and signals representing the feeler positions pass to and from the apparatus through suitable communication channels (cable or wireless h.f. signal transmission). The frame is provided with suitable means for moving it along the tracks to measure the roller gap spacing from pair to pair along the tracks. The tracks extend vertically or have a significant vertical component of extension, so that the apparatus can be lowered by a chain or the like by the force of gravity. For horizontal movement, the frame should be equipped with a belt drive engaging several of the rollers of the respective lower track and moving the apparatus along that track.

The frame is unfolded and folded through a suitable drive such as a pneumatic or a hydraulic drive or through a moved wedge. At least one centering roller (per set) may have the added function of reversably driving the respective track roller to test its reelability. The apparatus was developed primarily for testing the roller tracks of a curved withdrawal path for continuously cast ingots. The resulting apparatus is, however, applicable to test and measure roller tracks for other purposes, such as tracks moving plate stock from a rolling mill. The centering roller drive for track roller testing permits application of that function also to single or one-sided roller tracks. On the other hand, the apparatus can be used also to measure the interior dimensions of the mold for the continuous casting operation.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in conjunction with the accompanying drawings in which:

Proceeding now to the detailed description of the drawings, FIG. 1 shows a mold 10 for continuous casting of a curved ingot. The mold 10 has an opening 10a through which the ingot is withdrawn by means of two roller tracks which includes rollers 6 of one track and rollers 6' of the other track. The tracks are of curved configuration to veer the ingot into the horizontal. Accordingly, the track having rollers 6 will become the lower track, and the track having rollers 6' will become the upper track.

Figure 1:
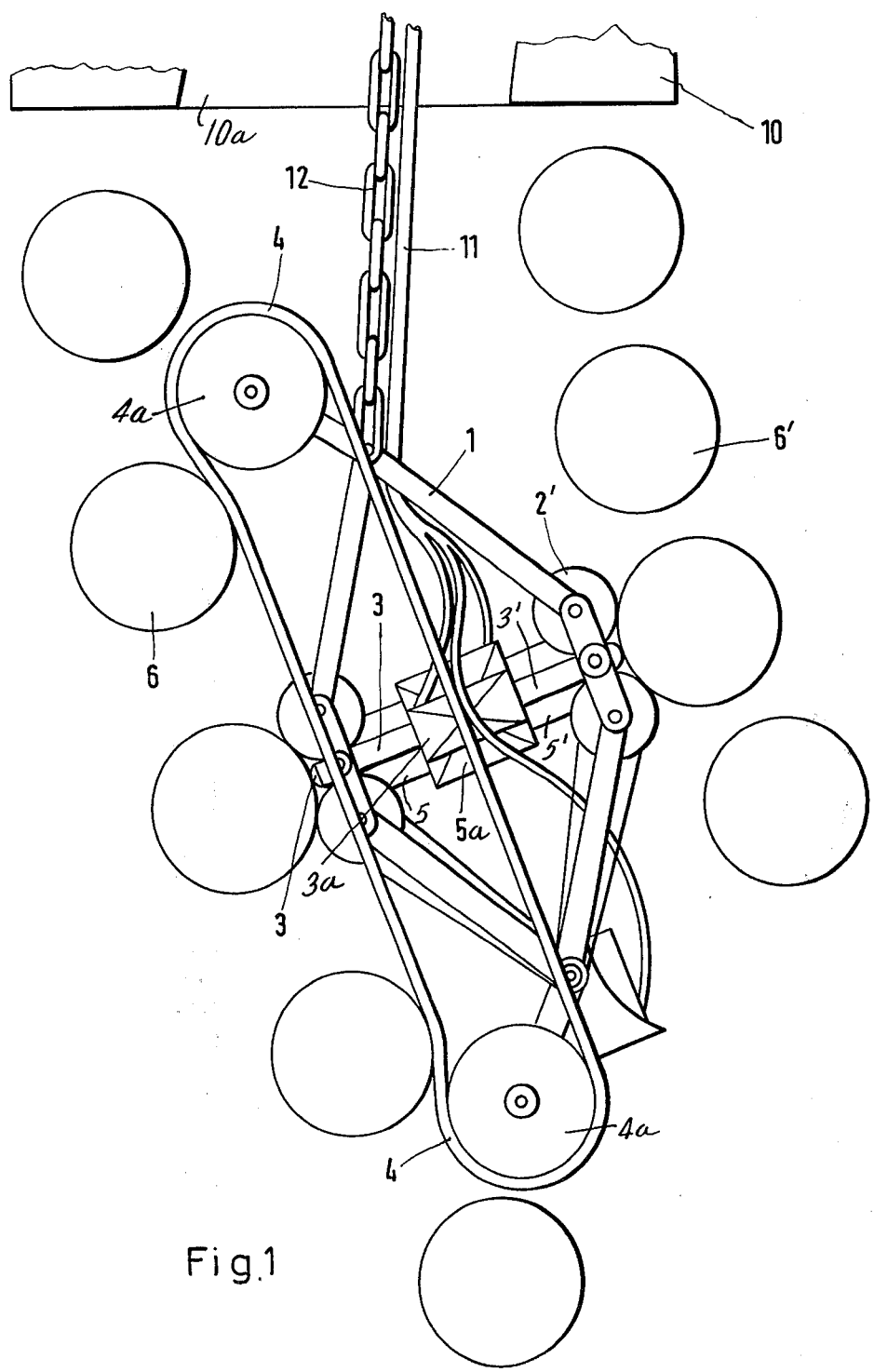
FIG. 1 is a side view of the exit portion of a mold for continuous casting and of the upper portion of ingot withdrawal rollers, showing also the measuring and test equipment in accordance with the preferred embodiment and in a representative test position inside of the roller tracks.

The measuring and test equipment is comprised of a frame 1 suspended by chain 12 from the casting stand. Two drive and conveyor belts 4, 4' are looped about suitable pulleys such as 4a which are journalled on arms and pertain to the frame 1. The belts guide and advance the equipment and they engage the withdrawal rolls 6. The belts have primarily guiding function as long as the frame is disposed in the more vertical portion of track and transport path. Movement of the frame 1 is obtained by force of gravity. However, for the more horizontal track portions, the belts function as drive to move the frame 1 and the equipment connected thereto along the lower track.

A plurality of (e.g. eight) centering rollers 2, 2' position the frame and the test equipment as a whole in particular relationship with respective pairs of withdrawal rollers 6, 6', facing each other across the withdrawal path for the ingot. The rollers 2, 2' are aligned in pairs along three orthogonal axes. At least one of the rollers 2 (or pair of rolls on a common shaft), engaging rolls 6 on the belt side, is driven by a reversable drive for testing the rolls 6 accordingly.

In particular, one set of four rollers 2 are provided for centering and positioning that frame corner on a roller 6, and the other set of four rollers 2' center the opposing frame corner on a roller 6' of each set, respective two rollers 2 are mounted on a common shaft, and the two shafts are disposed so that rollers upon engaging a track roller, 6 or 6', do so in symmetric relation to a plane running through the axis of the respective track roller, thereby centering the position of both sets of centering rollers, whereby the two planes involved coincide. As stated, the two sets of centering rollers are disposed in relation to extremities or opposing corners of the frame's parallelogram; thus, the centering position locates the frame so that the connection line between these corners is on the line of shortest distance between the peripheries of the particular two track rollers 6, 6' facing each other. That distance, of course, defines the gap width of the two roller tracks.

The frame 1 is of double, pantograph-like configuration; it can be folded or collapsed and unfolded or expanded, which amounts to a change of the angles of the parallelogram contour of the frame as seen in a direction parallel to the track rollers (FIG. 1). The folding and unfolding is obtained by a suitable drive 5a operating extension elements 5, 5' on the end of which are mounted the frame portions for journalling the centering rollers 2, 2'. This drive 5a, therefore, causes the centering rollers to center the frame once the frame has been moved into the vicinity of two track rollers 6, 6'. Externally issued command signals are run through a cable 11 to drive 5a for causing it to unfold or to fold the frame. Folding it is necessary to shorten the frame dimension transverse to the track extension so that the frame can be moved between the two roller tracks.

A pair of feeler rods 3, 3', which are centrally disposed in the frame, move in particular transversely direction to shafts on which pairs of the rolls 2 are journalled. The feeler rods are disposed in particular to move on a line of symmetry between centering rollers 2, 2'; they move on a line of shortest distance between two track rollers 6, 6', when the frame is adjusted in the just defined centering position.

The feelers 3, 3' are driven for uniform protraction and retraction by a drive 3a which may be a pneumatic or an electromotoric drive 3a, or a wedge may be driven between them being, e.g., solenoid operated to spread or retract the feelers.

The feelers 3, 3' are coupled to transducers monitoring their position and extension. These transducers are included in the drive 3a monitoring in any instant the relative positions of the feelers 3, 3' therein. The current extension and position of the feelers is signalled via cable 11 to external indicating and signal processing equipment (not shown), acquiring the position data for further use. The particulars of that use do not constitute a part of this invention, or the obtaining of the measuring data. The command control signals for the feeler drive will also pass through lines of cable 11.

The moving belts 4, 4' engage only rolls 6 on one side of the track, particularly the belts engage rolls on the track side having the larger radius of curvature. This track will become the lower support track for the object being moved after the tracks have veered into a horizontal direction. The lengths of the belts has been chosen so that they cover about three rolls. The chain is used to lower the measuring equipment into the more vertical portion of the track. As the track veers into the horizontal, the frame 1 and appended equipment is actually moved along the track by the caterpillar-like operation of belts 4, 4'.

The equipment is used in the following manner. The frame 1 as suspended by chain 12 may hang from a cover plate of the mold 10 and the chain may run through the mold which, of course, is not filled with any hot substance at that point. Actually, the measurement begins or may begin already in the mold. Introduction, of course, begins with a completely folded frame, but as soon as the rolls 2 are in the mold, the drive 5a is actuated causing drive rods 5, 5' to spread or unfold the frame until the rolls 2, 2' abut opposite walls. Next, the drive 3a advances the feeler rods 3, 3' until they engage the mold wall. The increased resistance together with suitable overload clutches, or couplings, stops the advance of the feeler rods and their position is signalled via cable 11 to the instruments on the operator's panel. The mold may be scanned in that manner until its dimensions have been ascertained.

Next, the frame 1 is lowered further until the roller 2, 2' face the first pair of track rollers 6, 6'. The frame 1 may have been partially folded again but feelers 3, 3' remain extended to signal when they have reached the first track rollers. Next, the frame is spread and since each feeler arm 3, 3' is associated with one subset of rollers 2 (or 2') above and another one below, these rolls 2, 2' center the frame on the rolls 6, 6'. Next, the feelers 3, 3' are accurately positioned to measure the smallest distance or aperture or gap width between two rolls 6, 6' facing each other across the transport path. Next, one of those rollers 2, 2' which engage one and the same roll 6 or 6', will be driven forward and backward to determine reelability of the track rollers.

Having completed all measurement related to one pair of track rollers, the frame is folded to some extent, and the equipment is lowered further to measure the gap or aperture width between the next pair of track rollers, etc. FIG. 1 actually shows the equipment while measuring and testing the third set of track rollers 6, 6'.

Figure 2:
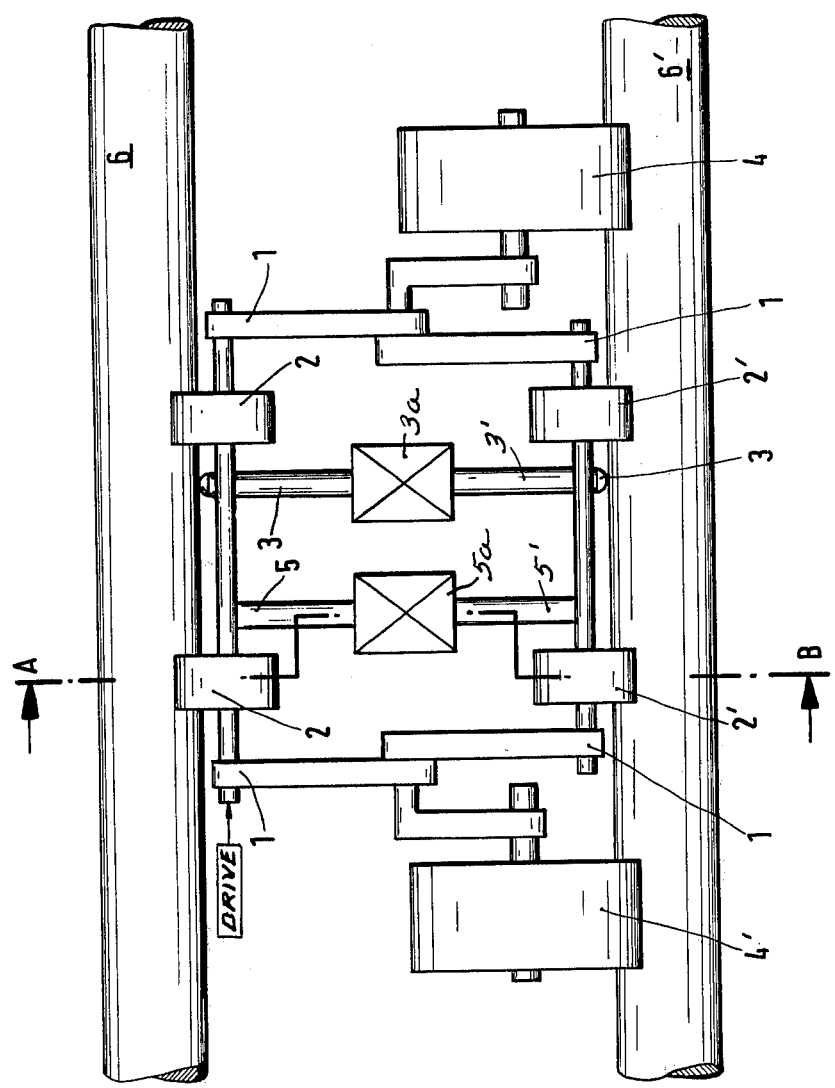
FIG. 2 is a top view of the equipment of FIG. 1.
Figure 3:
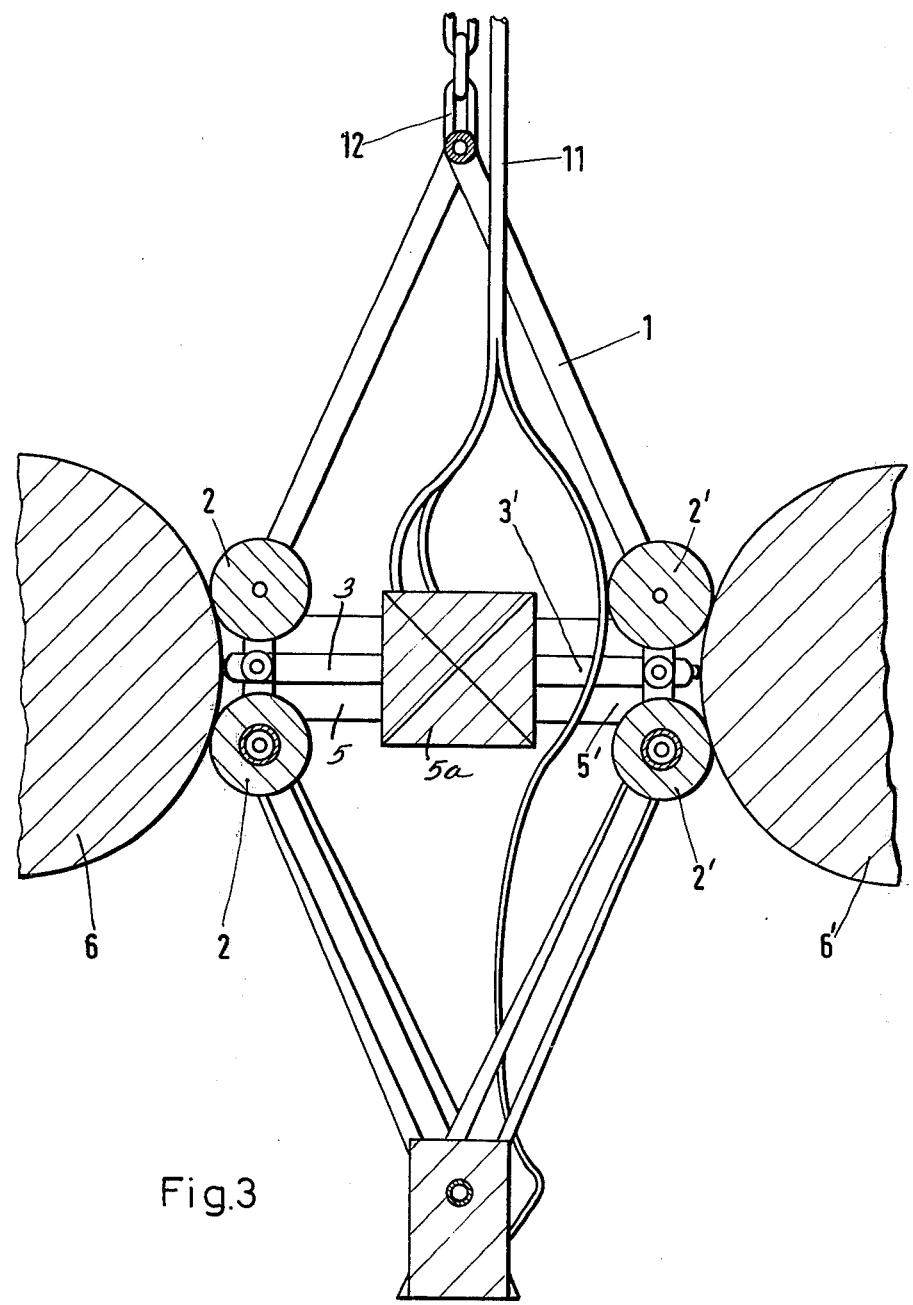
FIG. 3 is a view taken along line A–B in FIG. 2.

The equipment is shown to operate with symmetric extension of rods 5, 5' and 3, 3'. This is not essential in principle. Also, FIG. 2 shows that the equipment as testing the gap width between opposite placed track rollers, is about the center of each of them. However, the test may be carried out in addition to the left and to the right of the illustrated position, i.e. more towards either end of the track rollers to check as to bearing misalignments or the like, such as skew between rollers 6, 6'; they should extend parollers 6 and 6'.

It will be appreciated that the equipment is quite independent from the degree of curving and any changes in curvature of the withdrawal track. Of course, the equipment can also be used in straight vertical tracks or horizontal tracks withdrawing flat sheet stock from a rolling mill. The roller reeling test equipment (drive of a centering roll) permits use of the equipment to just test a single track path roller track as to the function of its rollers.

The invention is not limited to the embodiments described above but all changes and modifications thereof not constituting departures from the spirit and scope of the invention are intended to be included.

We claim:

1. Apparatus for measuring the spacing between rollers of two tracks facing each other in pairs across a transport path, comprising:

a frame constructed for being folded and unfolded and having opposite extremities which move toward and away from each other as said frame is folded and unfolded and having two sets of centering rollers mounted on respective opposite extremities for respectively engaging two opposed rollers of the two tracks and positioning the frame into a measuring position;

feeler means mounted on the frame for engaging the two opposed rollers of the two tracks when the frame is in the measuring position;

means for indicating the position of the feeler means in representation of the spacing between the two rollers of the two tracks; and means for providing for movement of the frame along the tracks.

2. Apparatus as in claim 1, wherein the means for providing movement includes at least one belt drive engaging at least several rollers of one of the tracks.

3. Apparatus as in claim 1, wherein the means for providing movement includes at least one chain chain element for suspending the frame between the two tracks which extend at least to some extent in a vertical direction.

4. Apparatus as in claim 1, said frame having an elevational contour of a parallelogram, the centering rollers being mounted to corner portions.

5. Apparatus as in claim 4, wherein each set of centering rollers includes at least one pair of rollers, the feeler means extending along lines of symmetry to the rollers of the pairs.

6. Apparatus as in claim 1, wherein the frame includes drive means for folding and unfolding the frame.

7. Apparatus as in claim 1, wherein means are provided for reversably driving at least one centering roller engaging a track roller.

* * * * *